Sept. 24, 1963  W. C. HICKS  3,104,488
WEED CATCHER FOR FISHING LINES
Filed June 11, 1962
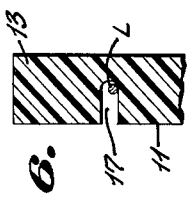
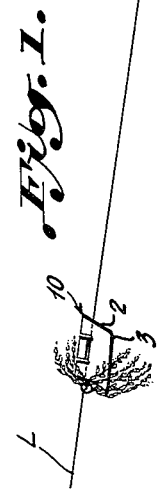
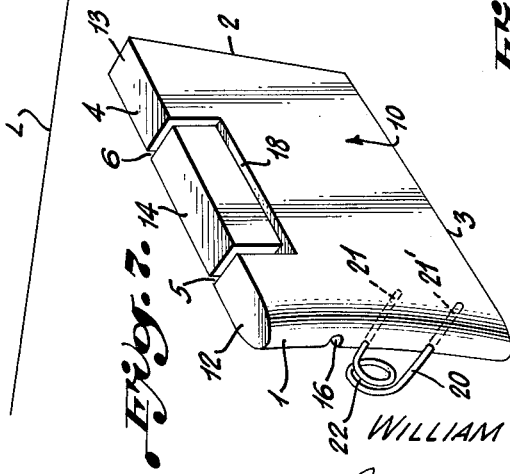
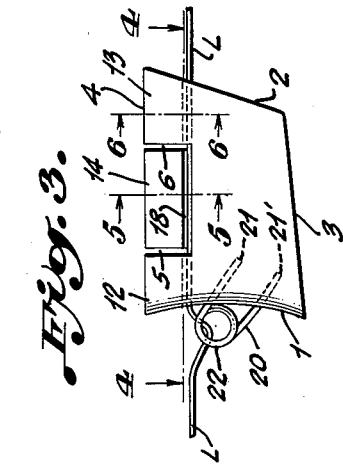
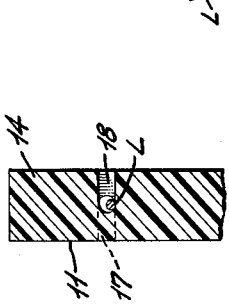
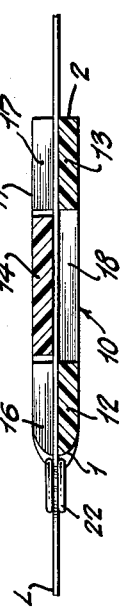
INVENTOR
WILLIAM C. HICKS
BY
ATTORNEY

United States Patent Office 3,104,488
Patented Sept. 24, 1963

3,104,488
WEED CATCHER FOR FISHING LINES
William C. Hicks, 1329 Park Ave., Bremerton, Wash.
Filed June 11, 1962, Ser. No. 201,466
3 Claims. (Cl. 43—44.88)

This invention relates to a fishing accessory and more particularly to a weed catcher for fishing lines employed in salt and fresh water fishing operations.

It is the object of the present invention to provide an attachment for a fishing line which is simple in construction, of low cost, and which may be applied to and removed from a fishing line easily and quickly for the purpose of entrapping weeds and other debris which otherwise might be engaged by the fishing hook and cover the bait thereon, thereby hindering the effective hooking of the fish in the course of trolling, commercial and sports fishing.

The weed catcher in accordance with the invention is spaced a suitable distance from the fishing hook to execute its function most expeditiously, and after the fish has been caught on the hook, the additional load on the line permits the weed catcher to slide along the fishing line and to be retained reliably thereon adjacent to the sinker until such time as the fish is withdrawn from the water. Thereafter the weed catcher may be removed easily from the line for cleaning, or the foreign matter may be separated therefrom while the same remains in engagement with the line adjacent to the sinker.

Other objects and purposes will appear from the detailed description of the invention following hereinafter, taken in conjunction with the accompanying drawing, wherein FIG. 1 is a front elevation of the weed catcher in accordance with the invention applied to a fishing line forwardly of the sinker and baited fishing hook trailing therebeyond;

FIG. 2 is a view corresponding to FIG. 1, showing the weed catcher adjacent to the sinker after the hooking of the fish onto the hook at the time when the fishing line is being pulled in by the fisherman;

FIG. 3 is a front elevation of the weed catcher in accordance with the invention, on an enlarged scale;

FIG. 4 is a sectional view along line 4—4 of FIG. 3;

FIG. 5 is a vertical sectional view along line 5—5 of FIG. 3;

FIG. 6 is a vertical sectional view along line 6—6 of FIG. 3; and

FIG. 7 is an enlarged perspective view of the weed catcher in accordance with the instant invention.

The weed catcher 10 in accordance with the invention may be formed of plastic, wood, light metal, or analogous material, and is designed to be yieldingly clamped to a fishing line L in advance of the sinker S and the fishing hook H forming part of the line, as illustrated in FIG.1. The object of the weed catcher 10 is to entrap and retain any weeds, debris or other foreign matter which would otherwise travel along the fishing line and foul the hook H and the bait B thereon, so that the fish would not be attracted thereto.

In order that the weed catcher perform its function effectively and with minimum disturbance, it is streamlined and shaped to resemble the contours of a ship travelling in the water. Thus, the plate 10, of suitable thickness, which in small sizes may approximate ¼", is provided with a forward edge 1 shaped concavely in a manner simulating the bow of a ship, and a rear inclined edge 2 shaped to resemble the stern of a ship. The bottom edge 3 is inclined upwardly from the lower extremity of the end 1 to the lower extremity of the end 2 relative to a substantially horizontal upper edge 4. The transverse cross-section of the forward end 1 is rounded in order to cause minimum turbulence as the plate is drawn through the water, and the concave outline thereof aids in retaining the foreign matter which is engaged thereby.

A pair of vertical slots 5 and 6 extend downwardly through the plate from the upper edge 4 to divide the upper portion of the plate into end portions 12 and 13 and midportion 14. Horizontal slots 16 and 17 are cut in the end portions 12 and 13, respectively, in one face 11 of the plate, while a horizontal slot 18 is cut in the mid-portion 14 in the opposite face of the plate 10 so that the bases of the slots are in substantially rectilinear alignment, as shown in FIG. 3.

A bifurcated wire clamp 20 may be imbedded in the forward end of the weed catcher with the free ends 21, 21' fixed solidly in the body of the plate. The intermediate portion of the clamp 20 is looped to form more than one turn, or multiple turns, of the wire to exert a spring action between adjacent turns so that the fishing line, after threading through the slots 17, 18 and 16, may be clamped between two of the turns of wire and retained on the line in this position, at a predetermined distance from the sinker, as illustrated in FIG. 1. This distance may vary in dependence upon the water conditions being encountered, and may, for example, be disposed twenty feet in advance of the sinker. The resilient hold of the clamp on the weed catcher, afforded by the clamping loops 22, is sufficient to retain the weed catcher in the set position illustrated in FIG. 1, to entrap any weeds thereon as the line is drawn through the water. After a fish F has swallowed the hook and the bait B thereon, the tugging of the fishing line exerts a sufficient pull to relinquish the grasp on the line by the clamp 22, as indicated in FIG. 3, until eventually the weed catcher is freed from the clamp so that the same travels along the line until it is stopped by the sinker S. At that time, whatever weeds may be entrapped by the weed catcher remain thereon, and any others which may pass the weed catcher are unimportant since the fish has already swallowed the bait and the fouling of the hook and the bait are no longer possible.

The instant invention has served to make fishing a more profitable and pleasurable pastime by helping to keep the fishing hook and bait thereon clear of weeds and other objectionable matter.

The weed catcher in accordance with the invention may be made in different sizes, for different purposes.

The use of clear plastic as a material for the weed catcher has proven eminently effective, but other materials could be used as well.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A weed catcher for a fishing line comprising a light plate provided with a pair of spaced rectilinear slots extending inwardly from one edge thereof to divide said plate adjacent the said edge into a mid-portion and two end portions, the end portions having aligned slots in one face thereof extending transversely to said first-mentioned slots, and the midportion having a slot in the opposite face thereof likewise extending transversely to said first-mentoned slots, with the base of said last-mentioned slot in substantial alignment with the bases of the slots in the end portions, so that said plate is adapted to be threaded onto the fishing line along a substantially straight length thereof along a line extending across the length of said plate which is displaced from said edge, a spring clamp at one end of said plate adapted to clamp releasably said plate to the fishing line in advance of the terminal hook portion of the fishing line carrying the hook and a sinker displaced therefrom, to entrap foreign matter and to shield the hook portion from interference thereby, said spring clamp adapted to release said line in response to the tugging of the line by bite of a fish on the hook to render free the movement of said plate with the foreign matter engaged thereby up to its arrest by the sinker, and said one end of said plate, whereat is mounted said spring clamp, being shaped concavely to trap the weeds more effectively.

2. A weed catcher for a fishing line terminating in a hook portion and comprising a light plate having a substantially horizontal upper edge, a concavely shaped forward edge, an inclined bottom edge extending upwardly from the lower end of said forward edge, and a more steeply inclined rear edge extending from said bottom edge to said upper edge, said plate having a pair of spaced rectilinear vertical slots extending downwardly from the upper edge thereof to divide said plate adjacent the said upper edge into a mid-portion and two end portions, the end portions having substantially horizontal aligned slots in one face thereof and the mid-portion having a substantially horizontal slot in the opposite face thereof, with the base of said last-mentioned slot in substantial alignment with the bases of the slots in the end portions, so that said plate is adapted to be threaded onto the fishing line along a substantially straight length thereof along a line extending across the length of said plate which is displaced from said upper edge, and a looped wire clamp projecting from the forward edge of said plate adapted to clamp releasably said plate to the fishing line in advance of the terminal hook portion thereof.

3. A weed catcher as set forth in claim 2 wherein the concavely shaped forward edge of said plate is rounded in cross-section to minimize turbulence as the same is drawn through the water.

References Cited in the file of this patent
UNITED STATES PATENTS

| | | |
|---|---|---|
| 2,235,236 | Ramseier | Mar. 18, 1941 |
| 2,399,298 | Sevegny | Apr. 30, 1946 |
| 2,459,287 | Robbins et al. | Jan. 18, 1949 |
| 2,526,031 | Kocarek | Oct. 17, 1950 |
| 2,592,967 | Snapps | Apr. 15, 1952 |
| 2,877,592 | Basgall | Mar. 17, 1959 |
| 2,926,452 | Lewis | Mar. 1, 1960 |
| 2,940,204 | Mehnert | June 14, 1960 |